United States Patent [19]

Zimmer et al.

[11] Patent Number: 5,357,434
[45] Date of Patent: Oct. 18, 1994

[54] METHOD AND APPARATUS FOR ADAPTING MOTOR VEHICLE DRIVE SLIP THRESHOLD VALUES FOR A DRIVE SLIP AND/OR A BRAKE SLIP CONTROL SYSTEM TO TIRES

[75] Inventors: Richard Zimmer, Fellbach; Armin Müller, Backnang; Rainer Freitag, Nürtingen, all of Fed. Rep. of Germany

[73] Assignee: Mercedes-Benz AG, Fed. Rep. of Germany

[21] Appl. No.: 826,948

[22] Filed: Jan. 27, 1992

[30] Foreign Application Priority Data

Jan. 26, 1991 [DE] Fed. Rep. of Germany ....... 4102301

[51] Int. Cl.$^5$ .............................................. B60T 8/56
[52] U.S. Cl. ........................ 364/426.02; 364/426.03; 180/197; 303/93; 303/95
[58] Field of Search ................... 364/426.01, 426.02, 364/426.03; 180/197; 303/91, 94, 95, 100, 102, 103, 109

[56] References Cited

U.S. PATENT DOCUMENTS

| | | | |
|---|---|---|---|
| 4,545,240 | 10/1985 | Leiber | 303/105 X |
| 4,758,053 | 7/1988 | Yasuno | 303/91 |
| 4,763,263 | 8/1988 | Leiber | 364/426.03 |
| 4,779,202 | 10/1988 | Leiber | 364/426.03 |
| 4,916,619 | 4/1990 | Walenty et al. | 364/426.02 |
| 4,923,255 | 5/1990 | Braschel et al. | 303/97 |
| 4,932,726 | 6/1990 | Iwata et al. | 303/100 |
| 4,947,332 | 8/1990 | Ghoneim | 364/426.03 |
| 4,984,165 | 1/1991 | Müller et al. | 364/426.02 |
| 4,999,778 | 3/1991 | Ruhl jet al. | 364/426.02 |
| 5,009,294 | 4/1991 | Ghoneim | 180/197 X |
| 5,047,941 | 9/1991 | Seki | 364/426.03 |
| 5,083,631 | 1/1992 | Nakayama et al. | 180/197 |
| 5,140,524 | 8/1992 | Matsuda | 364/426.02 |
| 5,255,193 | 10/1993 | Katayose et al. | 364/426.02 |

FOREIGN PATENT DOCUMENTS

3741247 12/1987 Fed. Rep. of Germany.

*Primary Examiner*—Thomas G. Black
*Assistant Examiner*—Collin W. Park
*Attorney, Agent, or Firm*—Evenson, McKeown, Edwards & Lenahan

[57] ABSTRACT

An apparatus and method adapts response slip threshold values for a drive slip and/or a brake slip control system to the tires fitted to a motor vehicle. The drive torque provided at the driven vehicle wheels is determined from measured operating data such as fuel supply and/or combustion air supply, engine speed and total transmission ratio of the drive train of the vehicle. From this determination, the adhesion coefficient $\mu_a$ utilized is determined with a predetermined or measured axle load at the driven vehicle wheels. From the correlation of these adhesion coefficients $\mu_a$ with measured values of the drive slip $\lambda_a$, the $\mu$ slip characteristic of the tires is determined and, corresponding thereto, the response slip thresholds $\lambda_A$ and $\lambda_B$ for the drive slip and the antiblocking control are set. A sliding averaging over the quotient $\mu_a/\lambda_a$ of continuously determined $\mu_a$, $\lambda_a$ value pairs is utilized for recognizing the tire characteristic of summer/winter tires.

8 Claims, 4 Drawing Sheets

METHOD AND APPARATUS FOR ADAPTING MOTOR VEHICLE DRIVE SLIP THRESHOLD VALUES FOR A DRIVE SLIP AND/OR A BRAKE SLIP CONTROL SYSTEM TO TIRES

BACKGROUND AND SUMMARY OF THE INVENTION

The present invention relates to a method and apparatus for adapting slip threshold values for a drive slip and/or brake slip control system to the tires fitted to a motor vehicle.

In the generally known method, the adhesion coefficient utilized between the roadway and the driven vehicle wheels is deduced from dynamic data of the vehicle acquired by wheel speed sensors individually allocated to the driven and the non-driven vehicle wheels, namely at least the speed of the vehicle and the slip of the driven vehicle wheels while the vehicle is in a dynamically stable state of motion, i.e. straight-ahead travel and equality of speed of the driven vehicle wheels. The $\mu$ slip characteristic of the tires is deduced from the correlation between this utilized adhesion coefficient ($\mu_a$) and the drive slip measured for this purpose. If the slip requirement of the tires required for the transfer of moment is greater or less than a value characteristic for a standard type of the tires, the response thresholds for the drive slip and/or the antiblocking control are raised or lowered.

According to this conventional method disclosed in DE 37 41 247 C1, a measuring window corresponding to a predetermined adhesion coefficient $\mu_o$ of predetermined mean amount of, for example, 0.4, is selected in the driving performance diagram characteristic of the vehicle which is equipped with the control devices. The driving performance diagram specifies the relationship between speed and achievable vehicle acceleration for the various transmission ratios, for example the measuring range which contains the achievable acceleration values in each case associated with speeds between 0 km/h and 100 km/h, typical values being around 2 m/s² in the selected example. Whenever value pairs from this measuring window are reached, with the vehicle speed and its propulsive acceleration being obtained from output signals of wheel speed sensors characteristic of the rotational wheel speeds of the non-driven front wheels in accordance with level and/or frequency, the current value of the drive slip is determined from the rotational wheel speeds of the driven rear wheels which are also measured by these individually allocated wheel speed sensors. If it is found that this drive slip is greater than the drive slip $\lambda_o$, compatible with the dynamic data of the vehicle, or associated with these for standard tires (e.g. summer tires fitted to the vehicle) with which drive slip the drive torque of the vehicle can be applied at the adhesion coefficient $\mu_o$, the response thresholds of the drive slip and, in the case of the antiblocking control, of the brake slip are also raised or lowered proportionally to the measured difference. As a result, a point acquisition of the $\mu$ slip characteristic of the tires is achieved such that the slip requirement, which differs for winter and summer tires, is adequately taken into consideration for the application of drive and brake torques.

This known method quite effectively takes into consideration different $\mu$ slip characteristics of the tires used in each case, in the sense of an adaptation of the control characteristic both of the drive slip control and of the antiblocking control in each case in the sense of better capability for utilizing drive moments provided in the drive train or braking forces which can be deployed by the brake system. It still, however, has at least the following disadvantages, essentially because of the restriction of the usable data to a measuring window which is allocated to a particular adhesion coefficient $\mu_o$:

1. In a situation where the drive slip is acquired during steep uphill or downhill travel, the measurement has unavoidable errors which can lead to an inadequate raising or lowering of the response thresholds.
2. Due to the fact that the data acquisition is limited to the comparatively narrow measuring window, a check of the usable adhesion coefficients and a corresponding change of the slip thresholds occur relatively infrequently so that, in practice, an adhesion-dependent change in the response thresholds is not possible. An updating of the response thresholds is inevitably very sluggish.

It is therefore an object of the present invention to improve such method and provide an apparatus for effecting the improved method with the aim that the adaptation of the slip thresholds occurs independently of the topographic conditions to meet the requirements of each situation and that the drive or brake slip threshold values of the two control types can be updated more rapidly.

With respect to the method, this object has been achieved by determining the drive torque provided at the driven vehicle wheels from fuel supply and/or air supply, engine speed and total transmission ratio of the drive train. The adhesion coefficient ($\mu_a$) utilized is determined, with predetermined or measured normal, axial load force at the driven wheels in accordance with the relationship $$\mu_a = F_z / L_{HA}$$

in which $F_z$ is the applicable traction force of the vehicle drive train which is given by the relationship $$F_z = M_z / r_{dyn}$$

in which $r_{dyn}$ is the dynamic rolling radius of the driven vehicle wheels and $M_z$ is the propulsive torque of the drive train applied via the roadway. From the correlation of the determined adhesion coefficient $\mu_a$ with the measured drive slip, the $\mu$ slip characteristic of the tires is determined and, corresponding thereto, the response slip thresholds $\lambda_A$ and $\lambda_B$ are set for the drive slip and antiblocking control.

According to other aspects of the present invention, the output torque of the vehicle engine is determined from the mass delivery rate of the combustion air supplied to the combustion chambers of the engine, and the engine torque is determined from the fuel quantity supplied to the engine.

Accordingly, the drive torque provided at the driven vehicle wheels is determined from a family of engine characteristics which reproduces the relationship between fuel supply and/or air supply and the engine speed, and the overall transmission ratio of the drive train. Thereby, the traction force $K_z$ effective at the driven vehicle wheels can be determined with a predetermined normal force, either assumed to correspond to a mean value or, if appropriate measuring devices are provided (such as, for example, sensors responding to the spring deflection state of the vehicle wheels or pressure transducers generating signals characteristic of the pressure in a level-regulating system), a measured normal force, which traction force satisfies the relation $$K_z = \mu_a K_N$$

in which $\mu_a$ designates the adhesion coefficient utilized and $K_N$ designates the effective normal force, and therefore the usable adhesion coefficient $\mu_a$ can be determined in accordance with the relation $$\mu_a = K_z/K_N.$$

This relation can be continuously evaluated by conventional technical apparatus also within the scope of a device provided for carrying out the method of the present invention.

Thus, the adhesion coefficient $\mu_a$ which can be utilized in each case is continuously determined and, at the same time, the $\mu$ slip characteristic of the tires is determined from the value of the drive slip which can also be continuously acquired. In connection therewith, the situations of the vehicle suitable for this drive slip are recognized from the fact that the front wheels, assumed to be not driven, have the same wheel speed, which is evaluated as an indication of straight-ahead travel of the vehicle, and also the driven rear wheels have identical, though greater, wheel speeds, from which the drive slip is determined by comparison with the wheel speeds of the front wheels. From the equality of the drive slip values of the driven rear wheels, a stable dynamic characteristic of the vehicle is deduced.

Among the results of the method according to the present invention are that the amount of the usable adhesion, which can be detected from the drive torque provided at the driven vehicle wheels and the drive slip values correlated therewith, is independent of the roadway topography and therefore meets the requirements of all situations. Another advantage is that the updating of the adhesion coefficients and required slip values which can be detected by this method is much closer to real time because it occurs more frequently than in the conventional method which is restricted to the acquisition of corresponding value pairs within a limited measuring window range.

As a result, a large number of errors in the control strategy are avoided which are otherwise possible such as, for example a premature response of the drive slip control during uphill driving. Another erroneous control strategy avoided is the faulty response of the control in cases in which the $\mu$ slip characteristic, particularly of the driven vehicle wheels, changes due to the operation of the vehicle, for example due to the fact that the tires of the driven rear wheels become very hot due to the manner of driving and, as a result, the slip requirement for transferring a predetermined traction force is increased.

The drive torque provided in the driven vehicle wheels can be determined via the family of engine characteristics from the volumetric efficiency of the combustion air supplied to the combustion chambers of the engine and, alternatively or in combination therewith, from the fuel quantity supplied to the engine, that is to say data which are in any case provided for processing in electronic control devices in current engine control systems. As a result in the final analysis, an optimum utilization of the fuel and/or also the prerequisites for catalytic minimization of the pollutant emission is to be achieved, and can therefore also be advantageously utilized for determining the characteristic tire values.

It is also possible with the present invention to detect the drive torque provided at the driven vehicle wheels via force or torque sensors arranged in the drive train, by means of which, for example, twisting deformations of elements of the drive train, particularly of the universal shaft, and/or forces acting in the joints themselves can be detected.

Due to the fact that it also enables low adhesion coefficients to be detected, the method according to the present invention also offers the advantage of realizing adequate tracking of the response thresholds of the respective control types within the range of extremely low adhesion coefficients of, for example, 0.3 and less. As a result, a sensitive control characteristic even with extremely poor road conditions is achieved.

To this extent, control algorithms can be used, for example in the range of such low adhesion coefficients, which are particularly suitable for a dynamically stable characteristic of the vehicle in the low $\mu$ range.

A device for achieving the method according to the present invention is provided in a road vehicle which is equipped at least with a drive slip control device and preferably also with an antiblocking system. The regulation-oriented control such system or systems is provided by an electronic control unit which generates from processing output signals of wheel speed sensor, which are characteristic in level and/or frequency of the wheel speeds of the driven and the non-driven vehicle wheels, the required drive signals for the drive slip control device and/or the antiblocking system. As a result, in the case of a drive slip control, a vehicle wheel tending to spin is decelerated again by activating its wheel brake and, if necessary, the engine torque is reduced. In the case of anti-blocking control, the braking forces are reduced when threshold values of the brake slip $\lambda_b$ and/or of the wheel decelerations are exceeded. In addition to the electronic control unit of the slip control systems, an electronic processing unit receives inputs in the form of:

1. Rotational speed u of the vehicle engine
2. Mass delivery rate of the combustion air quantity supplied to the engine and/or fuel quantity supplied to the engine
3. Wheel speeds of the driven and of the non-driven vehicle wheels and
4. Axle load $L_{HA}$ at the driven vehicle wheels, from which is determined the adhesion coefficient ($\mu_a$) instantaneously utilized in driving operation, from the relationship $$\mu_a = F_z/L_{HA}$$

in which $F_z$ is the applicable traction force of the drive train of the vehicle which, in turn, is given by the relationship $$F_z = M_z/r_{dyn}$$

in which $r_{dyn}$ is the dynamic rolling radius of the driven vehicle wheels and $M_z$ the propulsive torque of the drive train, which is applied via the roadway and which, in turn, is determined from the relationship $$M_z = M_{mot} \, i_{Ges} \, \eta_A$$

in which $i_{Ges}$ is the overall transmission ratio of the drive train, $\eta$ is the total mechanical efficiency of the drive train of the vehicle, and $M_{mot}$ is the output torque of the engine which, in turn, is determined from the relationship $$M_{mot} = p_{me} V_M / 4\pi$$

in which $V_M$ is the total displacement of the vehicle engine and $p_{me}$ is the mean combustion pressure in the engine which is determined from a family of curves characteristic of the vehicle engine.

The advantage of this apparatus can be seen from the fact that the determination of the engine torque from the mean effective combustion pressure and the engine displacement can be used for virtually al conventional vehicle types without being dependent on other special characteristics of their engine curves. This is of considerable advantage with respect to a virtually universal applicability of the device.

According to another aspect of the invention, a measurement variable suitable for determining the engine torque can be detected by the output signal of a conventional temperature-sensitive air mass sensor. If a device for detecting the loading state of the vehicle is also provided, this can also be used for detecting slopes or inclinations of the roadway and for an appropriate change in the response thresholds of the control types when driving uphill and downhill. Of course, the adaptation of known electronic control units of the respective control device(s) required for this are well within the skill of those in this art.

Moreover, a particularly simple and fast detection of a quantity significant for the variation of the tire characteristic can be provided by an electronic computer stage which continuously generates an electrical output signal characteristic of the adhesion coefficient ($\mu_a$) utilized. A comparison stage which continuously generates an output signal characteristic of the slip ($\lambda_a$) of the driven vehicle wheels and an evaluating unit synchronized with the electronic computer stage and the comparison stage are also provided. The evaluating unit forms from a multiplicity of mutually correlated $\mu_a$, $\lambda_a$ value pairs a continuous sliding mean of the quotient $\mu_a/\lambda_a$ as a quantity characteristic of the tires.

BRIEF DESCRIPTION OF THE DRAWINGS

These and further objects, features and advantages of the present invention will become more apparent from the following detailed description of a preferred embodiment when taken in conjunction with the accompanying drawings wherein.

DETAILED DESCRIPTION OF THE DRAWINGS

Figure 1:
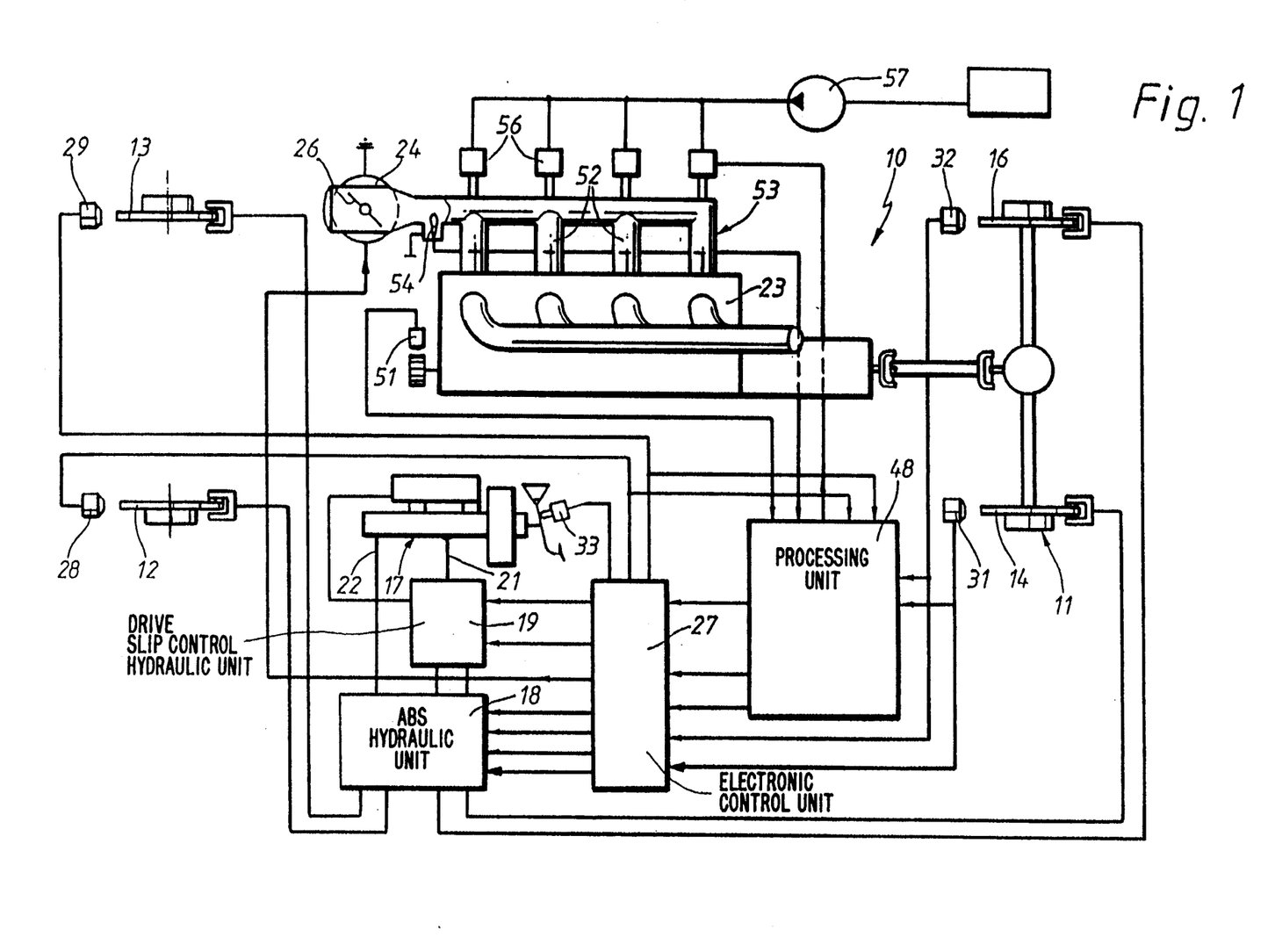
FIG. 1 is a simplified block diagram of a device according to the present invention for adapting slip threshold values for a drive slip control system to the tires fitted to a motor vehicle which is also equipped with an antiblocking system.

FIG. 1 is simplified representation of the drive train designated generally by numeral 10 and the hydraulic dual-circuit brake system designated generally by numeral 11 of a road vehicle which has a rear axle drive and a brake circuit allocation in which the left-hand front wheel brake 12 and the right-hand front wheel brake 13 are combined to form a front-axle brake circuit I and the left-hand rear wheel brake 14 and the right-hand rear wheel brake 16 are combined to form a rear-axle brake circuit II, to which braking pressure is applied by a braking device 17, e.g. a tandem master cylinder with vacuum brake booster.

The vehicle is also equipped with an antiblocking system (ABS) which is schematically represented as hydraulic unit 18, and with a drive slip control device (ASR) which is also schematically represented by an additional hydraulic unit 19.

It is assumed for explanatory purposes only that the ABS 18 is implemented as operating in accordance with the recirculating principle in a constructional and functional manner known per se, according to which brake fluid drained from a wheel brake subjected to the control is pumped back in brake pressure reduction phases of the antiblocking control into the master brake line 21 and 22 of the brake circuit I or II at which the antiblocking control is active.

It is further assumed that the ASR 19 operates in accordance with the principle of decelerating a driven vehicle wheel which tends to spin by actuating its wheel brake 14 or 16 and of reducing the output torque of the vehicle engine 23 at the latest when both rear wheels of the vehicle tend to spin, for example by a change of the position of the throttle flap 26, controlled by an electric motor 24, via which the delivery of combustion air to the combustion spaces of the engine 23 can be controlled, or by reducing the fuel supply and/or by intervention in the ignition in the case of engines with external auto-ignition.

Since brake pressure control valves (not shown) existing in connection with the ABS hydraulic unit 18 and provided for controlling brake pressure reduction, brake pressure holding and brake pressure build-up phases, can be utilized analogously for the drive slip control, the hydraulic unit 19 of the drive slip control device is only shown as an additional hydraulic unit connected between, as it were, the brake device 17 and the ABS hydraulic unit 18, and comprises an auxiliary pressure source, the output pressure of which is applied to the rear wheel brake(s) 14 and/or 16 in each case used for drive slip control, and a control valve arrangement by way of which the auxiliary pressure source can be connected to the brake circuit II of the driven rear wheels, and blocked off with respect to the brake device, in the situation requiring drive slip control.

The brake pressure control valves constructed as solenoid valves and utilized both for the antiblocking and for the drive slip control operation, and the function control valves, also constructed as solenoid valves, of the ASR hydraulic unit 19 are sequentially actuated and in combination corresponding to the respective control purpose by output signals of an electronic control unit 27 common to the two control devices. The control unit 27 generates these output signals from a processing of electrical output signals, containing the information on the dynamic behaviors of the vehicle wheels by level and/or frequency, of wheel speed sensors 28, 29 and 31, 32 individually allocated to the vehicle wheels. As a further input, the output signal of the brake light switch 33 is also fed to the electronic control unit 27.

Both the drive slip control device 19, 27 and the antiblocking system 18, 27 are actuated with, inter alia, the drive slip control device with a brake pressure build-up phase initiating a control cycle at one of the rear wheel brakes 14, 16, and the antiblocking system 18, 27 with a brake pressure reduction phase initiating an anti-blocking control cycle at at least one of the wheel brakes 12, 13, 14 and/or 18, when a threshold value $\lambda_A$ of the drive slip or a threshold value $\lambda_B$ of the brake slip is exceeded. The drive slip $\lambda_a$ is being defined by the relationship $$\lambda_a = (v_{RA} - v_F)/v_F \tag{1}$$

in which $v_{RA}$ designates the wheel speed of a driven vehicle wheel and $v_F$ the vehicle speed. The brake slip $\lambda_b$ is defined by the relationship $$\lambda_b = (v_F - v_{RB})/v_F \tag{2}$$

in which $v_{RB}$ designates the wheel speed of the braked vehicle wheel.

Whereas in the case of the drive slip control the wheel speed of a non-driven vehicle wheel can be assumed as vehicle speed, a reference speed $v_{ref}$ representing the vehicle speed which is generated by the electronic control unit 27 in accordance with a suitably predetermined algorithm must be determined during a braking operation during which all vehicle wheels rotate at a lower circumferential speed than the vehicle speed.

Using the above definitions of the drive slip $\lambda_a$ and of the brake slip $\lambda_b$ as a basis, the tangential force transfer characteristic of a tire can be represented by a $\mu$ slip curve in which the respective slip is plotted as the abscissa and the adhesion coefficient $\mu$ is plotted as the ordinate, which coefficient specifies the traction or deceleration force component, referred to the vehicle weight G, which can be utilized with a predetermined value of the drive or of the brake slip, respectively.

Such $\mu$ slip curves or "tire characteristics" can exhibit a drastically different variation for summer and winter tires, which also results in a drastically different response characteristic of an antiblocking and/or a drive slip control.

Figure 2:
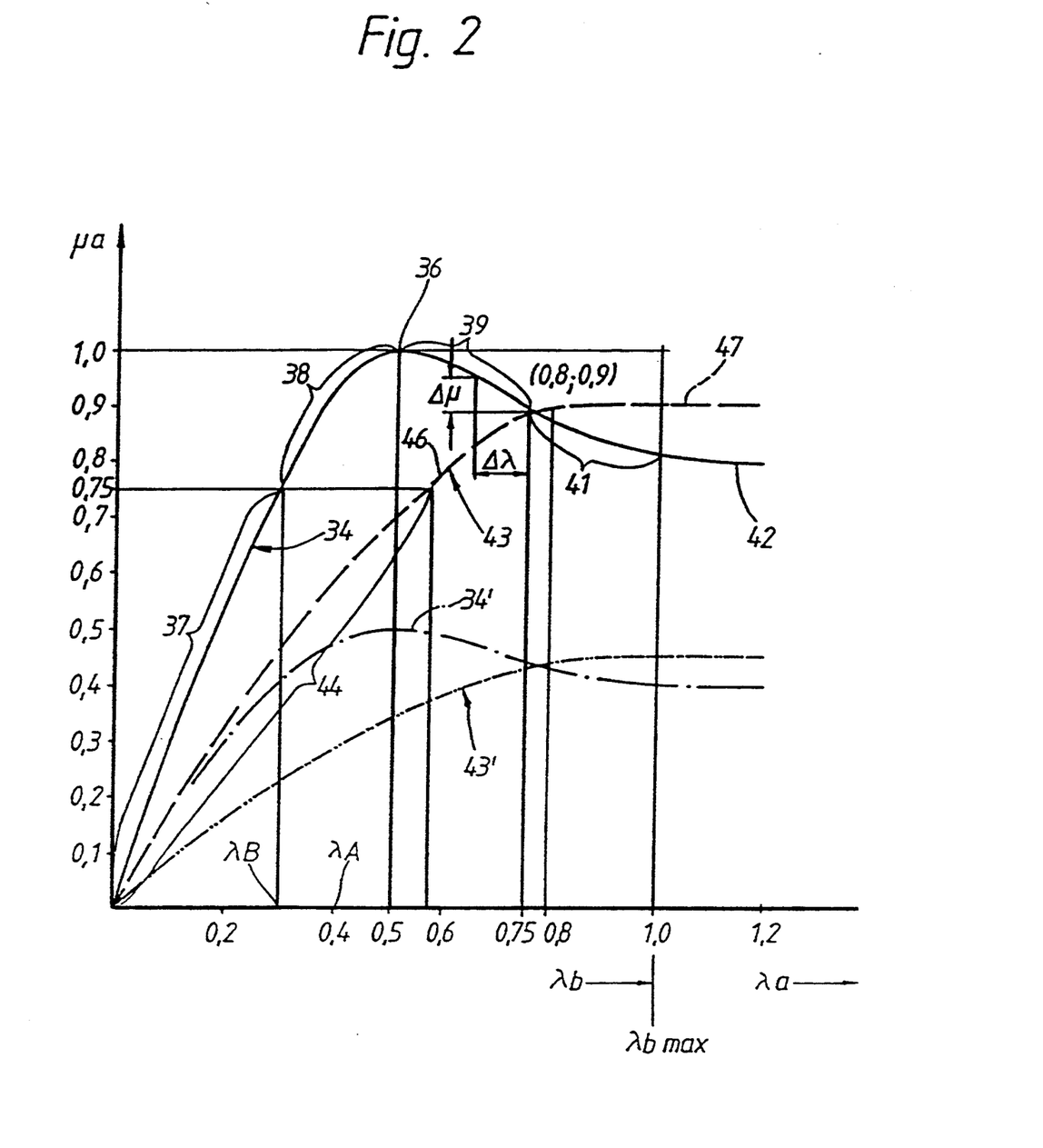
FIG. 2 is a diagram with $\mu$ slip curves for summer tires and winter tires fitted to a vehicle, for explaining the problems forming the basis of the present invention.

In FIG. 2, a first tire characteristic, represented by the solid line, is designated generally by numeral 34 and has a variation characteristic of a summer tire. Each point of this tire characteristic 34 has a corresponding ($\mu_a, \lambda_a$) or ($\mu_a, \lambda_b$) pair of values, which specifies which adhesion coefficient ($\mu_a$) can be utilized, whether for acceleration or for deceleration of the vehicle, at which particular drive slip $\lambda_a$ or brake slip $\lambda_b$. Wherever in the following description "$\lambda$" is used on its own as a slip designation, this is to be understood as both the drive slip $\lambda_a$ and the brake slip $\lambda_b$. This first characteristic line 34, characteristic of a summer tire, applies for the case where the vehicle is moving on a dry, non-slippery road which makes it possible to utilize a maximum adhesion coefficient $\mu_a$ of 1.0 both for propulsion and for braking of the vehicle, i.e. a traction force $F_z$ or a braking force $F_B$ can be transferred or utilized, the maximum amount of which corresponds to the vehicle weight G. It should be noted that, depending on the condition of the tire and/or of the roadway as well as on the dynamic state of the vehicle, higher adhesion coefficients than 1 are also utilizable, for example on account of the air negative-forces at high vehicle speeds, but also on account of specific material selection for the tires, by means of which alone $\mu$ values of around 1.2 can be achieved.

Let it be assumed for the illustrated embodiment that an adhesion coefficient $\mu_a$ having a maximum amount of 1 can be utilized. This maximum value has a corresponding maximum 36 of the tire characteristic 34, which is reached at a value of the slip $\lambda$ of 0.5. Between the coordinate origin ($\mu_a = 0$, $\lambda = 0$) and a value of the slip $\lambda$ of about 0.3, the tire characteristic 34 has a steeply rising branch 37, approximately proportional to the slip $\lambda$, along which branch the utilizable adhesion coefficient $\mu_a$ varies between 0 and 0.75. Towards greater values of the slip $\lambda$, i.e. between the values 0.3 and 0.5, the tire characteristic 34 has a curved branch 38, along which the slope of the tire characteristic steadily decreases, until it becomes 0 at the maximum 36. This branch 38, which is still rising, adjoins, at the maximum 36, a smooth curvature by descending branch 39 of the tire characteristic, descending from the maximum with an initially increasing amount of slope, the descent of which reaches its maximum value of about 0.5 ($\Delta_a/\Delta\lambda = -0.5$) at a value of the slip of about 0.75. This branch 39 of the tire characteristic 34, descending increasingly with greater $\lambda$ values, is in turn adjoined with smooth curvature by a further descending branch 41 of the tire characteristic 34, along which the amount of scope decreases and, finally, according to the representation of FIG. 2 at $\lambda = 1.0$, changes into an approximately horizontal branch 42 of the tire characteristic 34, along which, towards greater values of the drive slip $\lambda_a$, the utilizable adhesion coefficient $\mu_a$ remains constant and, in the example presented, has a value of 0.8.

It is characteristic of the summer tire, represented with respect to its transfer behavior by the tire characteristic 34, that it is capable of transferring relatively high traction and braking values between roadway and wheel at low slip values.

A second characteristic designated generally by numeral 43 in FIG. 2 illustrates the variation of a typical winter tire which has a coarsely structured profile and a relatively harder rubber mixture than a typical summer tire. This winter tire characteristic 43 also has a branch 44 which rises linearly in good approximation between the origin of the coordinates and a slip value of about 0.6 and which corresponds to an amount of the utilizable adhesion coefficient $\mu_a$ which increases with slip. Continuing this linearly rising branch 44 towards higher slip values and smoothly following the initial linear section 44, a curved transition branch 46 follows which smoothly changes into a horizontal branch 47, extending in parallel with the $\lambda$ axis, along which the utilizable adhesion coefficient remains approximately constant and has an approximate value of 0.9 in this example.

This second tire characteristic 43 representative of a typical winter tire applies to the same case as the summer tire characteristic 34, namely that the vehicle is driving along a dry, non-slippery road which would provide the possibility of utilizing a maximum adhesion coefficient of 1.0 if summer tires are used whereas, in contrast, the winter tire only allows a maximum adhesion coefficient of 0.9 to be utilized. The winter tire characteristic 43 extends much more flatly between the origin of the coordinates of FIG. 2 and its horizontal branch 43, approximately with half the slop compared with the summer tire characteristic 34 in the area of the origin of the coordinates which is equivalent to the slip requirement of the winter tie represented by the characteristic 43 being about twice as high as that of a summer tire in order to be able to utilize a predetermined adhesion coefficient.

Furthermore, a second summer tire characteristic designated by 34' overall is drawn dot-dashed which applies to the same type of tires as the first summer tire characteristic 34 but applies to the case where the vehicle wheels are rolling on ground which has much less grip and makes it possible to utilize a maximum adhesion coefficient of 0.5 at the most. The variation of the winter tire characteristic applicable to the same driving conditions is shown in dashed and double-dotted line by the characteristic curve designated generally by numeral 43'. The variation of this curve 43' qualitatively corresponds to that of the winter tire characteristic 43, but with lower values of the slope.

The tangential force transfer characteristic of summer and winter tires, which is different in accordance with the different variation of the summer and winter tire characteristics 34 and 43, presents problems both from the aspects of antiblocking control and from those of the drive slip control if the slip response thresholds for the respective control type are predetermined as fixed threshold values $\lambda_A$ and $\lambda_B$, so to speak. For example, $\lambda_A=0.4$ is the threshold value for the response for the drive slip control, and $\lambda_B=0.3$ is the response threshold value for the antiblocking control, where it is assumed that this choice of response threshold values $\lambda_A$ and $\lambda_B$ matches the summer tires predominantly fitted to a vehicle. Given these prerequisites, refitting the vehicle winter tires has the result that, with these tires, values of only around 50 to 60% of the values of the vehicle acceleration or vehicle deceleration which could be achieved with a summer tire under in each case comparable road conditions can be achieved when the drive slip and the antiblocking control responds, which, however, is only the result of the fact that the tangential force transfer capability of the winter tire, which has a higher slip requirement for transferring a particular traction or braking force, cannot be utilized because the slip thresholds $\lambda_A$ and $\lambda_B$ are set at values which are too low.

In order to achieve an optimum setting of the slip response thresholds both for the antiblocking control and for the drive slip control, independently of the type of tires used on the vehicle in each case, an electronic processing unit 48 is provided in the vehicle as shown in FIG. 1 associated with the drive train 10, the brake system 11, and the drive slip and antiblocking control devices 19, 27 and 18, 27. The operation of processing unit 48 will be explained below with the understanding that its electronic circuit implementation is quite easily possible in a variety of ways for one skilled in the art when the purpose as set forth in this application is known. Thus, an explanation of circuit details of this processing unit 48 is dispensed with so as not to obscure the present invention. Generally speaking, the electronic processing unit 48 processes a continuous acquisition of the adhesion coefficient $\mu_a$ utilized in each case and determines the instantaneous drive slip $\lambda_a$.

Figure 4:
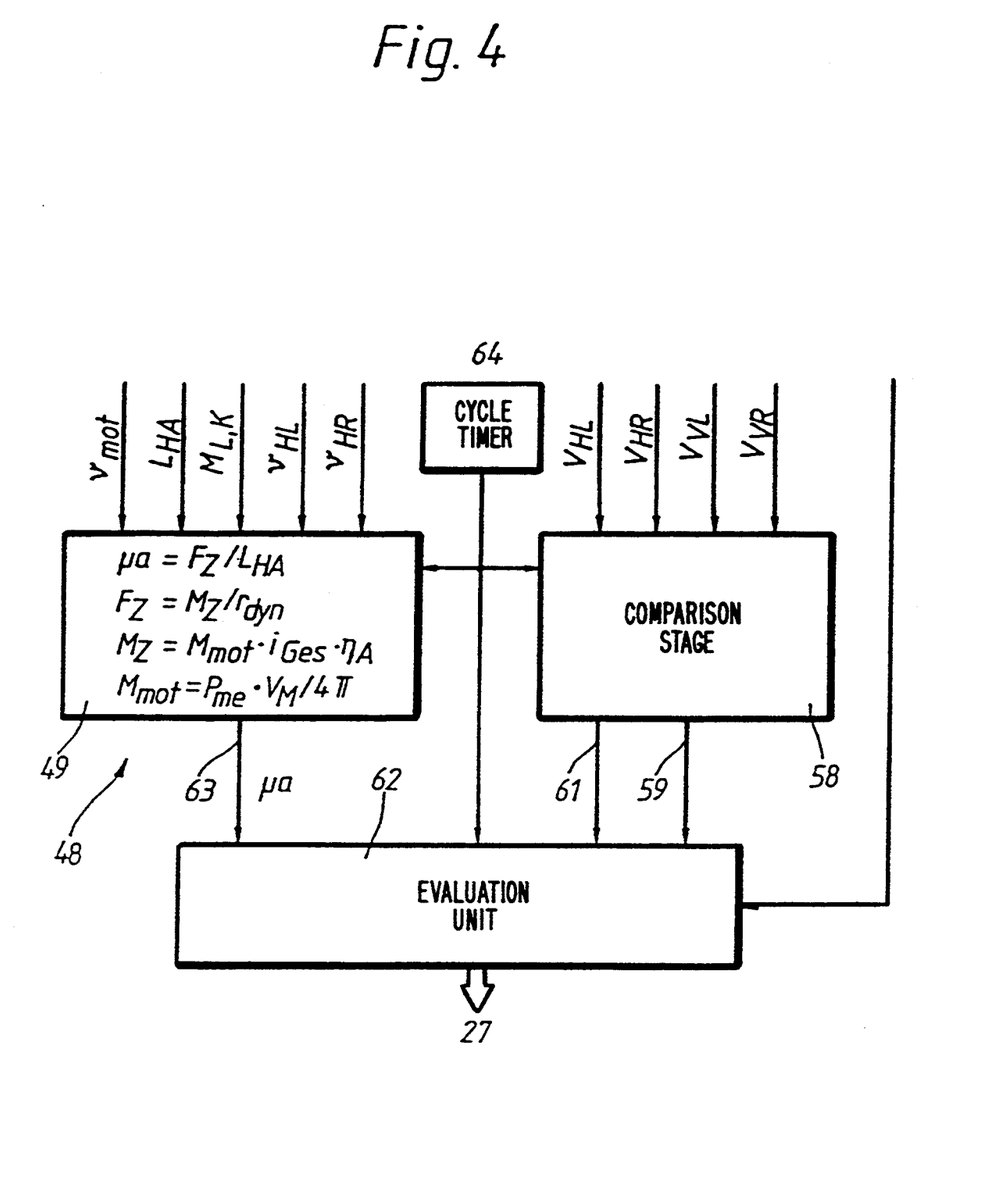
FIG. 4 is a simplified block diagram of an electronic processing unit provided within the scope of the device of FIG. 1.

With reference now to FIG. 4, the electronic processing unit 48 comprises an electronic computer stage which is supplied with the following variable inputs:

1. The engine speed $\nu$, a measure of which is the level and/or frequency of the output signal of a speed sensor 51 detecting the rotational speed of the crankshaft of the engine 23;
2. The air mass delivery rate $M_L$ of the combustion air supplied to the engine 23, a measure of which is the output signal of a hot wire anemometer 54 arranged immediately downstream of the throttle flap 26 and upstream of the intake manifolds 52 of the fuel/air supply system designated generally by numeral 53;
3. The wheel speed $\nu_{HL}$ and/or $\nu_{HR}$ of at least one of the driven vehicle wheels, a measure of which is the level and/or frequency of the output signal of the wheel speed sensor 31 and/or 32. Alternatively, or in addition, to the input of the air mass delivery rate, the electronic computer stage 49 can also be supplied, as a further input, with the information on the fuel quantity supplied to the engine 23 in unit time, which can be determined in a simple manner, for example, from the opening times of the injection valves 56 (assumed here to be solenoid valves) of the fuel/air supply section if the delivery capacity of the fuel pump 57 is known; and
4. The rear axle load $L_{HA}$, which can be either predetermined vehicle-type specifically or variable, in which case an electrical signal characteristic of the rear axle load can be obtained by a displacement or force sensor (not separately shown), which responds to the spring deflection state of the rear axle suspension.

By machine processing this data via an algorithm, the computer stage 49 generates an output which is a measure of the instantaneously utilized adhesion coefficient $\mu_a$.

In this machine processing operation, $\mu_a$ is determined from the relationship $$\mu_a = F_z / L_{HA} \quad (3)$$

in which $F_z$ designates the traction force of the vehicle drive train 10 which acts on the vehicle and can be applied with respect to the roadway and which, in turn, is given by the relationship $$F_z = M_z / r_{dyn} \quad (4)$$

in which $r_{dyn}$ designates the dynamic rolling radius of the driven vehicle wheels, which can be assumed to be constant, and $M_z$ designates the propulsive torque of the drive train 10, applied via the roadway, which, in turn, satisfies the relationship $$M_z = M_{mot} i_{Ges} \eta_A \quad (5)$$

in which $I_{Ges}$ designates the total transmission ratio of the drive train 10, $\eta_A$ designates the total mechanical efficiency of the drive train 10 of the vehicle and $M_{mot}$ designates the output torque of the engine 23 which can be determined from the relationship $$M_{mot} = p_{me} V_M / r\pi \quad (6)$$

in which $V_M$ designates the total displacement of the vehicle engine 23, and $p_{me}$ designates the mean combustion pressure in the engine 23, which can be determined as engine-specific value from a family of engine characteristics which can be retrievably stored in the computer stage 49 or is continuously generated from the acquisition of the engine speed, $v$, the air mass delivery rate $M_L$ and the fuel consumption with respect to the value of the mean combustion pressure instantaneously valid in each case.

Figure 3:
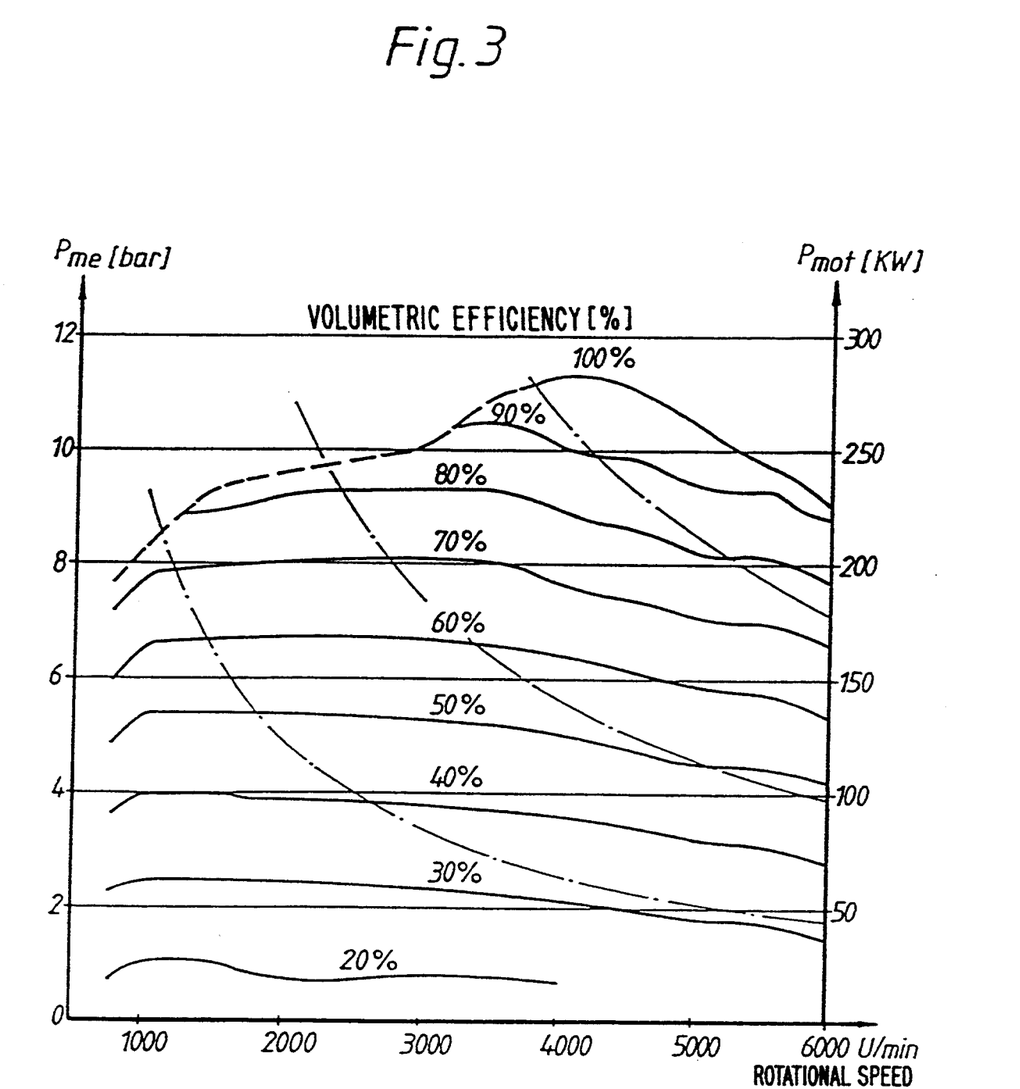
FIG. 3 is a family of engine characteristics for explaining a method according to the present invention, which can be carried out automatically by the device of FIG. 1.

In FIG. 3, a family of characteristics of this type, typical of a vehicle engine of 51 total displacement, is shown in which the relationship between the mean combustion pressure, plotted as ordinate and specified in bar, and the rotational speed is represented as the parameter for different air mass delivery rates.

Furthermore, the electronic processing unit 48 comprises a comparison stage 58 which is supplied as inputs with the output signals of the wheel speed sensors 28, 29 and 31, 32 characteristic of the wheel speeds of the vehicle wheels. This comparison stage 58 operates as follows:

From a comparison of the wheel speed of the left-hand rear wheel and of the left-hand front wheel and of the wheel speed of the right-hand rear wheel with that of the right-hand front wheel, signals characteristic of the values of the drive slip $\lambda_a$ and of the brake slip $\lambda_b$ present at the left-hand and at the right-hand rear wheel are generated which are continuously output at a slip signal output 59 of the comparison stage 58. The slip values are formed in accordance with equations (1) and (2).

Furthermore, the comparison stage 58 determines from a comparison of the wheel speeds of the front wheels whether the vehicle is travelling straight ahead which can be detected from the equality of the wheel speeds of the front wheels, or is travelling in a curve which can be detected from the values of the wheel speeds of the front wheels, or is travelling in a curve which can be detected from the values of the wheel speeds of the front wheels of the vehicle being unequal. Furthermore, the wheel speeds of the rear wheels are also compared with one another, with equality of the wheel speeds of the rear wheels being evaluated as an indication of a stable dynamic state of the vehicle. Furthermore, the comparison stage 58 is supplied with output signals of the ABS and ASR control unit by way of which the comparison stage 58 recognizes whether one of the two controls is actuated.

If neither the antiblocking system 18, 27 nor the drive slip control 19, 27 is actuated and if the vehicle is in a dynamically stable state travelling straight ahead, the comparison stage 58 outputs at a control output 61 a control signal resulting from a logical AND combination of the operating stage signals characteristic thereof, by way of which an evaluating unit 62 of the electronic processing stage 48, following the electronic computer stage 49 and the comparison stage 58, is actuated to enter the $\lambda$ and $\mu_a$ value pairs, provided in a suitably coded format at the slip signal output 59 of the comparison stage 58 and at a $\mu_a$ signal output 63, into a storage unit (not shown separately), provided in connection with the evaluating unit 62, for example a shift register, into which the $\lambda$, $\mu_a$ value pairs are entered at a rate determined by a cycle timer 64, which corresponds to the rhythm in which $\mu_a$ and $\lambda$ value pairs intended for storage occur.

With each entering of a new, most recent value pair into the shift register, all value pairs hitherto stored in the shift register are shifted on by one address, the oldest value pair in time being deleted.

To explain the rest of the operation of the evaluation unit 62, it will be assumed that a value pair ($\mu_a$, $\lambda$) can be determined and entered into the evaluating unit 62 every 15 ms, that is to say that during a time interval corresponding to a usual starting-up process of the vehicle which last 5 s, 100 value pairs can be entered if the drive slip control device has not been actuated in the meantime. Since the response of the drive slip control device at the determining threshold value $\lambda_A$, which is 0.4 in the illustrated embodiment (FIG. 2), prevents value pairs having higher slip values than the response threshold value $\lambda_A$ from being entered, the value pairs entered into the evaluating unit 62 only cover those interpolation points of the tire characteristic 34 or of the tire characteristic 43 of summer or winter tires, respectively, which are located along the approximately linear branches 37 and 38 of the summer tire characteristic 34 or the rising branch 44 of the winter tire characteristic 43. The quotient $\mu_{ai}/\lambda_{ai}$, designating the order in which the value pairs ($\mu_a,\lambda_a$) are entered, is thus a good measure of the respective slop of the tire characteristic 34 or 43 so that the initial slopes of the respective tire characteristic 34 or 43 can be very accurately detected, and from this the type of tires fitted on the vehicle can be deduced, from a continuous averaging of the quotients of the value pairs ($\mu_a,\lambda_a$) in each case instantaneously stored.

In a simplest embodiment, the evaluating unit 62 is configured for such a determination of the variation of the tire characteristic 34 or 43 by averaging over the quotients $\mu_a/\lambda_a$ of the value pairs in each case instantaneously stored. As long as the vehicle is in operation, i.e. the ignition is switched on and the vehicle is moving, this averaging is continuously updated so that changes in the tire characteristics 34 or 43 due to changes in the operating conditions, for example due to heating of the tires, can also be detected. Since an adequately high number of $\mu_a$, $\lambda_a$ value pairs is detected within a single acceleration process, for example during the starting, the evaluating unit 62 in every case recognizes in good time the tire type with which the vehicle is equipped and generates information signals for the electronic ABS and ASR control unit 27 via which the latter is set for the optimum response threshold values $\lambda_A$ and $\lambda_B$ for the tire type recognized in this manner, for the respective control type, namely antiblocking or drive slip control.

After the evaluating unit 62 has determined the type of tire with which the vehicle is equipped, it first compares the quotient $\mu_a/\lambda_a$ of the last value pair entered in each case with the mean value of the value pairs entered previously. If this quotient deviates from the long-time mean by more than a threshold value of, for example, 20%, this is interpreted by the evaluating unit 62 that the vehicle is travelling on a roadway area having a low adhesion coefficient $\mu_a$ and the response thresholds $\lambda_A$ and $\lambda_B$ for the drive slip control operation and the antiblocking control operation, respectively are therefore reduced as a precaution, for example to 70% of their original values, so that a more sensitive response of the two control types is achieved in the low-$\mu$ range detected in this manner. A value pair, the quotient of which deviates in the manner from the long-time mean, is not taken into consideration during the continuous averaging so that the sensitivity of the low-$\mu$ recognition process is not impaired.

Naturally, the evaluating unit 62 could also be configured differently from that embodiment described above, without departing from the scope of the present invention with the aim of determining an overall variation of the tire characteristics 34 or 43 by interpolation between the $\mu_a$, $\lambda_a$ value pairs which are continuously entered, and of checking a value pair newly to be entered, before it is also used for the interpolation, with respect to the size of its distance from the respective tire characteristic 34 or 43 so that it is then either taken into consideration for further interpolation or used for low-$\mu$ recognition.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for adapting slip threshold values for a drive slip control system and a brake slip control system to tires fitted to a motor vehicle, comprising the steps of (a) determining, during a dynamically stable state of motion of the vehicle in which straight-ahead travel and equality of speed of driven vehicle wheels occur, an adhesion coefficient, $\mu$, utilized between a roadway and driven vehicle wheels of the motor vehicle from dynamic data of the vehicle comprising speed of the vehicle and drive slip of the driven vehicle wheels detected by wheel speed sensors individually allocated to the respective driven and to non-driven vehicle wheels of the motor vehicle, (b) deducing from the correlation between the utilized adhesion coefficient, $\mu$, and the measured drive slip, a $\mu$ slip characteristic of the tires, and (c) changing, if a slip requirement of the tires which is required for transfer of a defined torque differs from a value characteristic of a standard type of the tires, response thresholds for the drive slip control and the brake slip control system wherein the step of determining the adhesion coefficient includes (a') determining drive torque provided at the driven vehicle wheels from measured supply parameters of a combustion engine of the motor vehicle, engine speed and total transmission ratio of the drive train, (a'') utilizing one of predetermined and measured normal force representative of axle load, LHA, at the driven vehicle wheels in accordance with the relationship $\mu_a = F_z/L_{HA}$, in which $F_z$ designates applicable traction force of the drive train of the motor vehicle as defined by the relationship $F_z = M_z/r_{dyn}$ in which $r_{dyn}$ is the dynamic rolling radius of the driven vehicle wheels and Mz is the propulsive torque of the drive train applied via the roadway, and (a''') determining from the correlation of the adhesion coefficient with the measured drive slip, the $\mu$ slip characteristic of the tires and (a'''') setting the response slip thresholds for the drive slip and the antiblocking control corresponding to the determined $\mu$ slip characteristic of the tires.

2. The method according to claim 1, wherein the device torque of the motor vehicle is determined from mass delivery rate of combustion air supplied to the combustion chambers of the engine.

3. The method according to claim 1, wherein the drive torque is determined from fuel quantity supplied to the engine of the motor vehicle.

4. The method according to claim 3, wherein the drive torque of the engine is determined from mass delivery rate of combustion air supplied to the combustion chambers of the engine.

5. A device for carrying out the method for adapting slip threshold values for a drive slip control system and a brake slip control system for a road vehicle, comprising (a) an electronic control unit configured to generate from processing output signals of wheel speed sensors representative of at least one of level and frequency of the wheel speeds of the driven and the non-driven vehicle wheels, required drive signals for the drive slip control system and the brake slip control system such that, in the case of a drive slip control, a vehicle wheel tending to spin is decelerated again by actuating its associated wheel brake and, if such braking is insufficient to reduce the drive slip below a threshold value, the engine torque is reduced and, in the case of brake slip control, the braking forces are reduced when a threshold value of at least one of brake slip and the wheel decelerations is exceeded, and (b) an additional electronic processing unit inputted with rotational speed of the vehicle engine, at least one of mass delivery rate of combustion air quantity supplied to the engine and fuel quantity supplied to the engine, wheel speeds of the driven and of the non-driven vehicle wheels, and axle load, LHA, at the driven vehicle wheels, to determine the adhesion coefficient instantaneously utilized in driving operation, from the relationship $$\mu_a = F_z/L_{HA}$$

in which $F_z$ is applicable traction force of a drive train of the vehicle which, in turn, is determined by the relationship $$F_z = M_z/r_{dyn}$$

in which $r_{dyn}$ is the dynamic rolling radius of the driven vehicle wheels and $M_z$ is the propulsive torque of the drive train, which is applied via a roadway and which, in turn, is determined from the relationship $$M_z = M_{mot} i_{Ges} \eta_A$$

in which $i_{Ges}$ is the overall transmission ratio of the drive train, $\eta$ is the total mechanical efficiency of the drive train of the vehicle, and $M_{mot}$ is the output torque of the engine which, in turn, is determined from the relationship $$M_{mot} = p_{me} V_M/4\pi$$

in which $V_M$ is total displacement of the vehicle engine and $p_{me}$ is mean combustion pressure in the engine which is determined from a family of curves characteristic of the vehicle engine wherein operatively associated with the electronic processing unit are an electronic computer stage to continuously generate an electrical output signal characteristic of the utilized adhesion coefficient, a comparison stage to continuously generate an output signal characteristic of the slip of the driven vehicle wheels, and an evaluating unit synchronized with the electronic computer stage and the comparison stage to form from a multiplicity of mutually correlated instantaneous adhesion coefficient and drive slip value pairs a continuous sliding mean of the instantaneous adhesion coefficient and drive slip quotient as a quantity characteristic of the tires and to adjust, in dependence on the drive slip quotient, the threshold values to initiate a respective mode of control in drive slip control and in brake slip control.

6. The device according to claim 5, wherein a temperature-sensitive air mass flow measuring device is provided for detecting the mass delivery rate of the combustion air.

7. The device according to claim 5, wherein an axle load measuring device responding to spring deflection of the vehicle suspension is configured to generate electrical output signals representing axle load.

8. The device according to claim 7, wherein a temperature-sensitive air mass flow measuring device is provided for detecting the mass delivery rate of the combustion air.

* * * * *